(12) United States Patent
Yano et al.

(10) Patent No.: US 8,649,111 B2
(45) Date of Patent: Feb. 11, 2014

(54) OPTICAL ELEMENT, OPTICAL ELEMENT MODULE, ELECTRONIC ELEMENT MODULE, AND ELECTRONIC INFORMATION DEVICE

(75) Inventors: Yuji Yano, Osaka (JP); Hideyuki Kurimoto, Osaka (JP); Shohgo Hirooka, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 14 days.

(21) Appl. No.: 13/416,667

(22) Filed: Mar. 9, 2012

(65) Prior Publication Data

US 2012/0229916 A1    Sep. 13, 2012

(30) Foreign Application Priority Data

Mar. 11, 2011    (JP) ................. 2011-054837

(51) Int. Cl.
*G02B 13/20* (2006.01)

(52) U.S. Cl.
USPC ............ 359/707; 359/619; 359/627; 359/599

(58) Field of Classification Search
USPC ......... 359/602, 603, 605, 620–625, 627, 628, 359/707, 738, 739, 794–797
See application file for complete search history.

(56) References Cited

U.S. PATENT DOCUMENTS

| 6,124,977 | A  | * | 9/2000 | Takahashi ...................... 359/636 |
| 6,898,027 | B2 | * | 5/2005 | Yamada et al. ................ 359/796 |
| 7,672,064 | B2 | * | 3/2010 | Sakaki ........................... 359/738 |
| 7,684,124 | B2 | * | 3/2010 | Shinozawa ..................... 359/738 |
| 2009/0147368 | A1 | * | 6/2009 | Oh et al. ........................ 359/622 |
| 2009/0174947 | A1 |   | 7/2009 | Hasegawa |
| 2010/0052192 | A1 |   | 3/2010 | Hasegawa et al. |
| 2010/0073531 | A1 |   | 3/2010 | Yano et al. |
| 2010/0073532 | A1 |   | 3/2010 | Yano et al. |
| 2010/0073533 | A1 |   | 3/2010 | Yano et al. |
| 2010/0073534 | A1 |   | 3/2010 | Yano et al. |
| 2010/0079635 | A1 |   | 4/2010 | Yano et al. |
| 2010/0079642 | A1 |   | 4/2010 | Kurimoto et al. |
| 2010/0133419 | A1 |   | 6/2010 | Suetake |
| 2011/0050978 | A1 |   | 3/2011 | Yano et al. |
| 2011/0050988 | A1 |   | 3/2011 | Yano et al. |
| 2011/0075272 | A1 | * | 3/2011 | Yuan et al. .................... 359/715 |
| 2011/0096213 | A1 |   | 4/2011 | Hasegawa |

FOREIGN PATENT DOCUMENTS

| JP | 62-153908 A | 7/1987 |
| JP | 2004-088713 A | 3/2004 |
| JP | 2005-025074 A | 1/2005 |
| JP | 2009-036822 A | 2/2009 |

(Continued)

OTHER PUBLICATIONS

Office Action issued in JP2011-054837 on Dec. 25, 2012.

*Primary Examiner* — Evelyn A. Lester
*Assistant Examiner* — William Alexander
(74) *Attorney, Agent, or Firm* — Edwards Wildman Palmer LLP; David G. Conlin; Edmund J. Koundakjian

(57) ABSTRACT

The present invention provides an optical element, comprising: a side surface where incident light undergoes diffuse reflection inside the optical element, between the outline of a top optical surface and a bottom optical surface; and an inclined surface for total reflection of diffuse reflection from the side surface, formed at least between the side surface and the bottom optical surface.

19 Claims, 10 Drawing Sheets

(56) References Cited

FOREIGN PATENT DOCUMENTS

| | | |
|---|---|---|
| JP | 2009-147092 A | 7/2009 |
| JP | 2009-147093 A | 7/2009 |
| JP | 2009-154484 A | 7/2009 |
| JP | 2009-229749 A | 10/2009 |
| JP | 2009-251249 A | 10/2009 |
| JP | 2009-266901 A | 11/2009 |
| JP | 2010-056170 A | 3/2010 |
| JP | 2010-102312 A | 5/2010 |
| JP | 2010-102313 A | 5/2010 |
| JP | 2010-103490 A | 5/2010 |
| JP | 2010-103491 A | 5/2010 |
| JP | 2010-103492 A | 5/2010 |
| JP | 2010-103493 A | 5/2010 |
| JP | 2010-110839 A | 5/2010 |
| JP | 2010-129989 A | 6/2010 |
| JP | 2011-48303 A | 3/2011 |
| JP | 2011-048304 A | 3/2011 |
| JP | 4764941 B2 | 9/2011 |
| JP | 4764942 B2 | 9/2011 |
| JP | 4768060 B2 | 9/2011 |
| JP | 4800291 B2 | 10/2011 |
| JP | 4819152 B2 | 11/2011 |
| JP | 4832500 B2 | 12/2011 |

* cited by examiner

FIG. 3
(a)
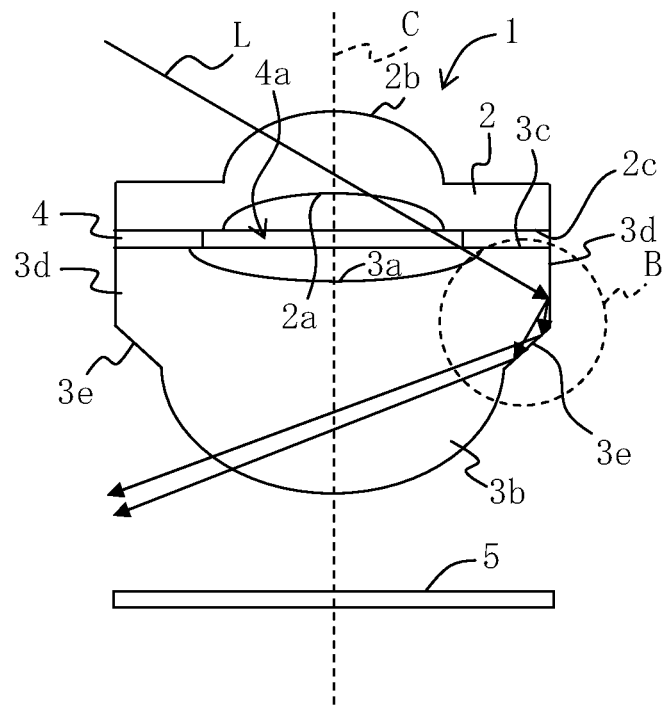
(b)
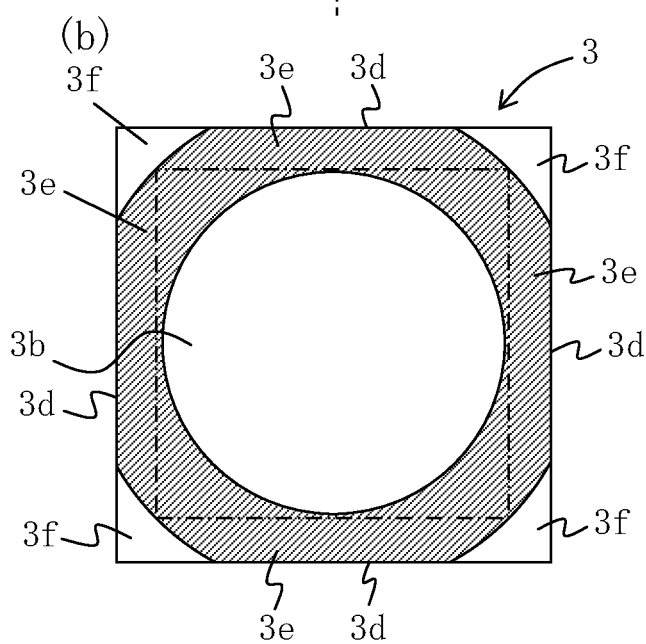

FIG. 6
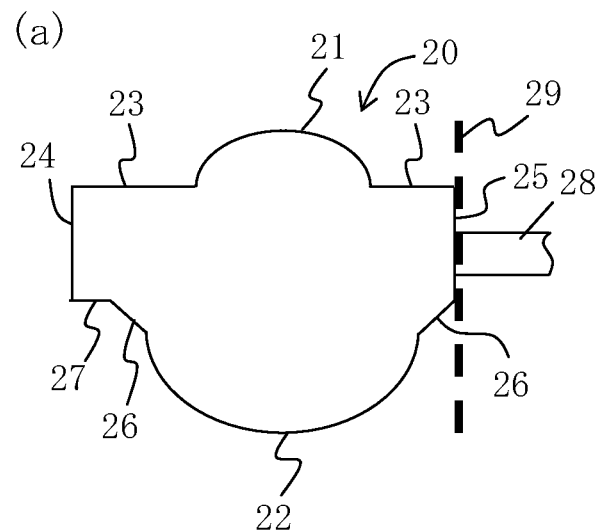
(a)
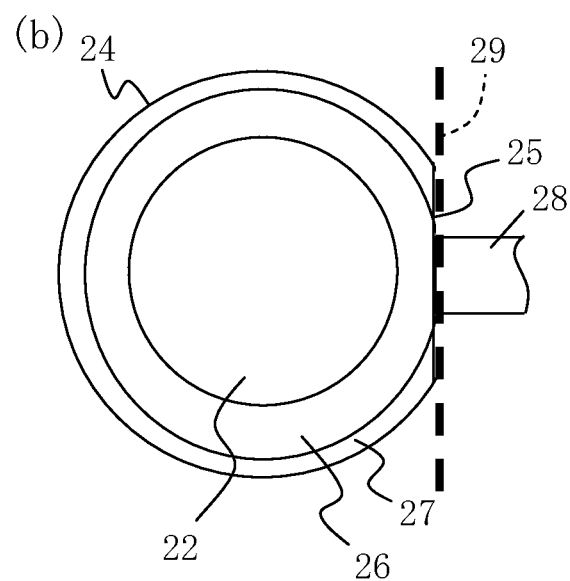
(b)

-- PRIOR ART --

-- PRIOR ART --

FIG. 11
(a)
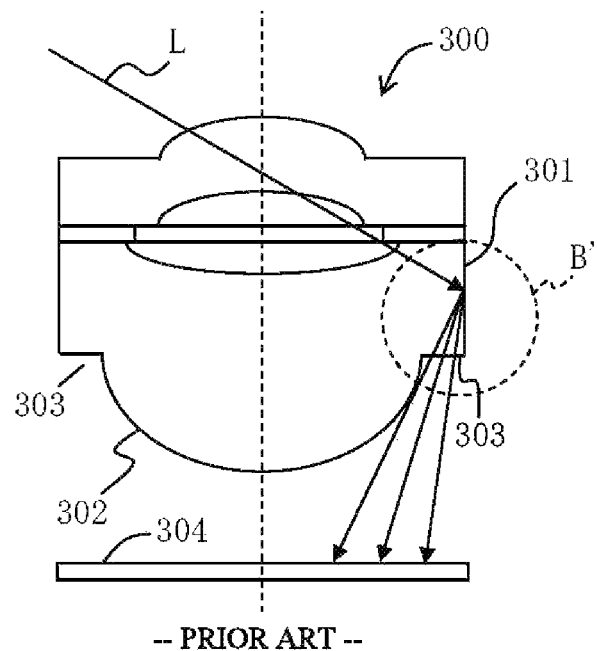
-- PRIOR ART --
(b)
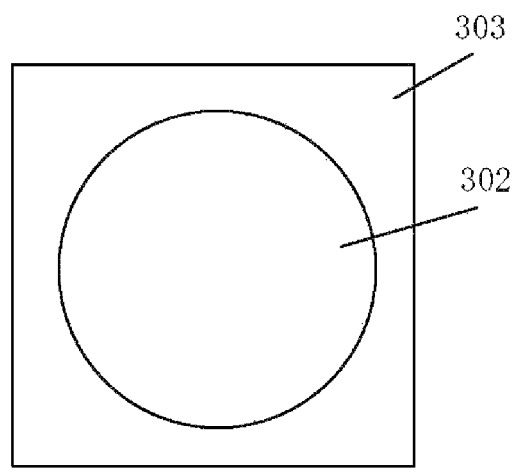
-- PRIOR ART --

-- PRIOR ART --

OPTICAL ELEMENT, OPTICAL ELEMENT MODULE, ELECTRONIC ELEMENT MODULE, AND ELECTRONIC INFORMATION DEVICE

This nonprovisional application claims priority under 35 U.S.C. §119(a) to Patent Application No. 2011-054837 filed in Japan on Mar. 11, 2011, the entire contents of which are hereby incorporated by reference.

BACKGROUND OF THE INVENTION

1. Field of the Invention

The present invention relates to: an optical element such as a lens; an optical element module cut from an optical element wafer module stacked with one or more optical element wafers having a plurality of lenses arranged in a two-dimensional pattern; an electronic element module where the optical element or the optical element module is modularized with an electronic element; and an electronic information device, such as a digital camera (e.g., a digital video camera or a digital still camera), an image input camera, a scanner, a facsimile machine, a personal digital assistant (PDA), a camera-equipped cell phone device, and a video telephone device using the electronic element module in an imaging section.

2. Description of the Related Art

For a conventional electronic information device having an imaging element and a light gathering lens element thereabove, such as a camera-equipped cell phone device and a personal digital assistant (PDA), further improvement in image quality as well as reduction in size and cost is demanded.

FIG. 9(a) is a perspective view of a conventional imaging lens unit disclosed in Patent Literature 1. FIG. 9(b) is a longitudinal cross-sectional view of the imaging lens unit in FIG. 9(a) along the line A-A'.

In FIGS. 9(a) and 9(b), in a conventional imaging lens unit 100, three lenses 101 to 103 are modularized by stacking sequentially from the top so that the light axes C align. The optical axes C of the three lenses 101 to 103 are aligned at the lens centers. Flange sections 101a to 103a are provided at the outer peripheral sections of the lenses 101 to 103, respectively, extending in a direction perpendicular to the optical axis C of the lenses 101 to 103. The flange sections 101a to 103a are not provided with protrusions or grooves for positioning. The flange sections 101a to 103a have a substantially square outline in a plane view, and comprises flange side surfaces 101b to 103b, respectively, aligned to the four outer wall planar surfaces mostly parallel to the optical axis C. Flange side surfaces 101b to 103b arranged in a same direction are disposed on the same planar surface along the direction of the optical axis C.

The lens 101 comprises a top lens surface 101c constituting a convex surface, and a bottom lens surface 101d constituting a concave surface. The lens 102 below the lens 101 comprises lens surfaces 102c and 102d constituting a convex surface for both the top and bottom surfaces. The lens 103 below the lens 102 comprises a top lens surface 103c constituting a concave surface, and a bottom lens surface 103d constituting a planar surface. The lens surface 101d side of the flange section 101a and the lens surface 102c side of the flange section 102a are in contact with each other. The lens surface 102d side of the flange section 102a and the lens surface 103c side of the flange section 103a are also in contact with one another.

FIG. 10 is a longitudinal cross-sectional view of a conventional imaging lens unit disclosed in Patent Literature 2.

In FIG. 10, a conventional imaging lens unit 200 is disposed by sequentially stacking four lenses 201 to 204 from the top along the optical axis C. For the four lenses 201 to 204, thick flanges 201a to 204a are provided, respectively, in the direction of the optical axis C at the outer peripheral section where there is no effect to the image formation functions. Among the side surfaces 201b and 201c through 204b and 204c of the flanges sections 201a to 204a of each lens, the side surface 201c of the lens 201 and the side surface 202b of the lens 202; the side surface 202c of the lens 202 and the side surface 203b of the lens 203; and the side surface 203c of the lens 203 and the side surface 204b of the lens 204 are each matched, and by attaching each matched surface, each lens 201 to 204 adheres in a state where the relative positions of each lens 201 to 204 are maintained.

Patent Literature 1: Japanese Laid-Open Publication No. 2004-088713

Patent Literature 2: Japanese Laid-Open Publication No. 62-153908

SUMMARY OF THE INVENTION

In each of the conventional imaging lens unit 100 disclosed in Patent Literature 1, surface touching the cut surface is planar. There has been a problem of stray light L undergoing diffuse reflection at the cut surface and reaching the imaging element surface through the planar section, causing ghost and flare. FIGS. 11(a) and 11(b) are used to describe this in greater detail.

FIG. 11(a) is a longitudinal cross-sectional view schematically showing: a lens module comprised of: a lens unit, consisting of a plurality of lenses, cut from a lens wafer module formed and laminated from a plurality of lenses at the wafer level; and an imaging element. FIG. 11(b) is a rear view of the lens module of FIG. 11(a).

In the FIGS. 11(a) and (b), stray light L enters a lens of a lens module 300 from a diagonal direction and undergoes diffuse reflection at a rough cut surface 301. The reflected stray light L enters the imaging surface of an imaging element 304 placed below through a planar section 303 provided at the outer periphery of an optical surface 302 of a bottom side lens. The stray light L is captured at the imaging element 304 and causes ghost and flare. FIG. 12 further shows an expanded view of the section B' in FIG. 11.

In FIG. 12, the cut surface of lens 301 is coarse due to separation into individual pieces. Thus, stray light L hitting the cut surface 301 from the inside undergoes diffuse reflection, leading to the stray light L proceeding in various directions. When angles θ11 to θ13 formed between the proceeded stray light L and the planar section 303 are greater than a predetermined angle, the stray light L does not go through total reflection and leaves through the planar section 303 to the outside. The stray light L passing through the planar section 303 reaches an imaging region. If the cut surface of lens 301 is not coarse, light undergoes total reflection when the angle is small. In general, however, the stray light L has a steep angle with respect to the cut surface 301. Thus, the stray light L passes through the cut surface 301, eliminating the possibility of the stray light L passing through the planar section 303.

Each conventional imaging lens unit 200 disclosed in Patent Literature 2 has an inclined section on the side surface of the lens, but the four lenses 201 to 204 are merely sequentially stacked at the inclined sections from the top along the optical axis C to match positions. The inclined section inclines in the opposite direction from the incline direction where the stray light reflected at the lens side surface undergoes total reflection. Also, the lens side surface is not a cut surface, thus the previously mentioned diffuse reflection does not occur at the lens side surface. Thus, the inclined section of each conventional imaging lens unit 200 disclosed in Patent Literature 2 is not for total reflection of stray light reflected at the lens side surface.

The present invention is intended to solve the conventional problems described above. An objective of the present invention is to provide: an optical element, such as a lens, capable of preventing the cause of ghost and flare by keeping stray light reflected at the lens side surface from reaching the imaging region of an imaging element; an optical element module cut collectively from an optical element wafer module; an electronic element module where the optical element module and an electronic element are modularized; and an electronic information device, such as a camera-equipped cell phone, using the electronic element module as an image input device in an imaging section thereof.

An optical element according to the present invention includes: a side surface where light undergoes diffuse reflection inside the optical element between the outline of a top optical surface and a bottom optical surface; and an inclined surface for total reflection of diffuse reflection from the side surface, formed at least between the side surface and the bottom optical surface, thereby achieving an objective described above.

Preferably, in an optical element according to the present invention, the inclined surface is inclined at an acute angle in the direction perpendicular to optical axes of the top optical surface and the bottom optical surface.

Still preferably, in an optical element according to the present invention, the angle of the incline inclined at an acute angle is between 40 degrees and 50 degrees inclusive.

Still preferably, in an optical element according to the present invention having a toric shape in a plane view or a shape in a plane view where a toric outer peripheral section is cut off using the four sides of a quadrangle in a plane view as chords, the inclined surface is provided on the outer periphery of the bottom optical element in a plane view.

Still preferably, in an optical element according to the present invention, the ratio of the length of the side where the inclined surface is directly adjacent to the side surface to the whole side of the quadrangle in a plane view is greater than or equal to one tenth and less than or equal to one half.

Still preferably, in an optical element according to the present invention, a portion of or the entire side surface is a cut surface.

Still preferably, in an optical element according to the present invention, a lens wafer with a plurality of lenses arranged in a two-dimensional matrix pattern is cut by a wafer level process such that the side surface is a cut surface.

Still preferably, in an optical element according to the present invention, a runner sprue on a side surface of a lens is cut by an injection molding process such that the side surface is partially a cut surface.

Still preferably, in an optical element according to the present invention, the inclined surface is formed in a toric shape on the outer periphery of the bottom optical surface in a plane view, and the side surface and a partially toric planar surface in a plane view are formed on the outer periphery of the inclined surface in a plane view, in a shape in a plane view with the outer periphery with a circular bottom surface outline in a plane view cut off using at least one side as a chord.

Still preferably, in an optical element according to the present invention, the optical element is a light gathering lens.

An optical element module according to the present invention stacked with a plurality of optical elements includes an optical element according to the present invention at the bottom, thereby achieving an objective described above.

Preferably, in an optical element module according to the present invention, a light shield plate is provided between a top optical element and a bottom optical element, and the optical elements and the light shield plate are laminated in a state where the optical axes of opposing optical surfaces of each optical element and the center of the opening section are aligned at top and bottom.

Still preferably, in an optical element module according to the present invention, each of the optical elements is provided with a flange section with a quadrangular outline in a plane view having a planar surface on the outer periphery in a plane view of opposing optical surfaces.

An electronic element module according to the present invention includes: an optical element according to any of claims 1 to 10 or an optical element module according to any of claims 11 to 13; and a solid-state imaging element in which a plurality of light reception sections are formed in a matrix pattern for photoelectrically converting and capturing an image of incident light from a subject penetrating through the optical element or the optical element module, thereby achieving an objective described above.

Preferably, in an electronic element module according to the present invention, the shape of part of an optical element closest to the solid-state imaging element in contact with a cut surface has an inclined surface in the optical element or the optical element module produced by cutting.

An electronic information device according to the present invention is provided, using the electronic element module according to the present invention in an imaging section as an image input device, thereby achieving an objective described above.

Hereinafter, functions of the present invention in the configuration described above will be described.

An optical element in the present invention has a side surface, from which incident light under goes diffuse reflection inside, between the outline of a top optical surface and a bottom optical surface. An inclined surface is formed for total reflection of diffuse reflection from the side surface, between at least the side surface and the bottom optical surface. Also, in an optical element module of the present invention, a plurality of optical elements are stacked, including an optical element of the present invention at the bottom. Further, an electronic element module of the present invention comprises a solid-state imaging element, in which a plurality of light reception sections are formed in a matrix pattern for photoelectrically converting and capturing an image of incident light from a subject penetrating through the optical element of the present invention or the optical element module of the present invention.

Accordingly, an inclined surface is formed, which is for total reflection of diffuse reflection from the side surface, at least between the side surface and the bottom optical surface. Thus, it is possible to prevent the cause of ghost and flare by keeping stray light reflected off the lens side surface from reaching an imaging region of the imaging element.

According to the present invention described above, since an inclined surface is formed, which is for total reflection of diffuse reflections from the side surface, at least between the side surface and the bottom optical surface, ghost and flare can be prevented by keeping stray light reflected off of the lens side surface from reaching an imaging region of an imaging element.

These and other advantages of the present invention will become apparent to those skilled in the art upon reading and understanding the following detailed description with reference to the accompanying figures.

BRIEF DESCRIPTION OF THE DRAWINGS

FIG. 1(a) is a perspective view schematically showing two lens wafers and a light shield plate therebetween prior to laminating. FIG. 1(b) is a perspective view schematically showing a lens wafer module after laminating.

FIG. 3(a) is a longitudinal cross-sectional view schematically showing a lens module, consisting of two lenses, separated into individual pieces by cutting a lens wafer module formed and laminated from a plurality of lenses at a wafer level. FIG. 3(b) is a back view of the lens module in FIG. 3(a).

FIG. 6(a) is a longitudinal cross-sectional view for describing the production method of the lens module in FIG. 5(a). FIG. 6(b) is a back view of the lens module in FIG. 6(a).

FIG. 11(a) is a longitudinal cross-sectional view schematically showing: a lens module comprised of a lens unit, consisting of a plurality of lenses, cut and separated into smaller pieces from a lens wafer module formed and laminated from a plurality of lenses at the wafer level; and an imaging element. FIG. 11(b) is a rear view of the lens module in FIG. 11(a).

Figure 1:
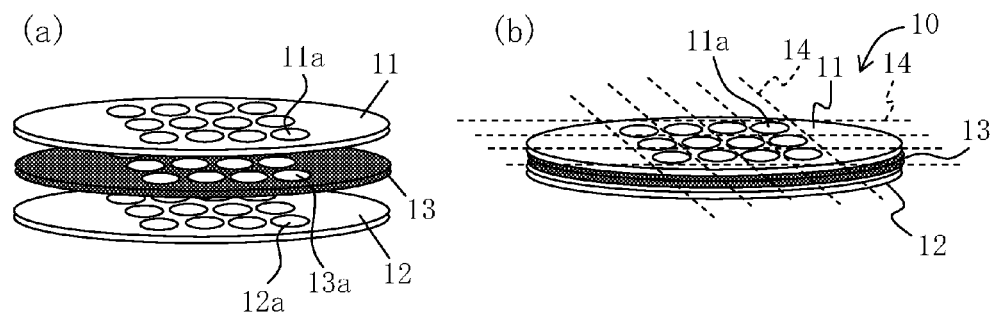
FIG. 1 is a perspective view for briefly describing the production method of a lens wafer module according to Embodiment 1 of the present invention.

1 lens module (optical element module)
2, 3 lens
2a, 2b, 3a, 3b lens surface
2c, 3c flange section
3d cut surface
3e inclined surface
4 light shield plate
4a opening section
5 solid-state imaging element
10 lens wafer module (optical element wafer module)
11, 12 lens wafer
11a, 12a lens
13 light shield plate
13a opening section
14 cut line
20 lens (optical element)
21 top lens surface
22 bottom lens surface
23 flange section
24 circumferential side surface
25 side planar surface
26 inclined surface
27 planar surface
28 runner sprue
29 cut location
30 imaging module (electronic element module)
31 holder member
32 lens holder
33 substrate
34 IR cut-off filter
35 adhesion section
90 electronic information device
91 solid-state imaging apparatus
92 memory section
93 display section
94 communication section
95 image output section

DESCRIPTION OF THE PREFERRED EMBODIMENTS

Hereinafter, detailed descriptions of the embodiments of the present invention with reference to the drawings are given for: an optical element and an optical element module of the present invention according to Embodiments 1 and 2; an electronic element module according to Embodiment 3, where the optical element or the optical element module according to Embodiments 1 and 2 is modularized with an electronic element; and an electronic information device according to Embodiment 4, such as a camera-equipped cell phone, using the electronic element module according to Embodiment 3 as an image input device in an imaging section thereof. With respect to the prepared figures, the thicknesses, lengths, or the like of the elements in the figures are not limited to the configurations shown.

Embodiment 1

FIG. 1 is a perspective view for briefly describing the production method of a lens wafer module according to Embodiment 1 of the present invention. FIG. 1(a) is a perspective view schematically showing two lens wafers and a light shield plate therebetween prior to laminating. FIG. 1(b) is a perspective view schematically showing a lens wafer module after laminating.

As shown in FIG. 1(a), initially, two lens wafers 11 and 12 on the top and bottom are disposed as optical element wafers having a plurality of lenses arranged in a two-dimensional matrix pattern, and a light shield plate 13 is disposed between the two lens wafers 11 and 12 on the top and bottom, where an opening section for each lens is formed in a matrix pattern. Next, the positions of lenses 11a, 12a, and an opening section 13a are aligned, such that the positions of the lenses 11a and 12a of the respective lens wafers 11 and 12, and the position of the opening section 13a of the light shield plate 13 align. Prior to the position alignment of the lens wafers 11, 12, and the light shield plate 13, adhesive (not shown) is applied on the top surface and the back surface of the light shield plate 13, in such a manner as to include a lens at the center of the opening section 13a of the light shield plate 13, along the cut line (dotted line) in a lattice pattern described below in a wider area than the cut line. The location of the adhesive application corresponds to: a planar flange section at the outer periphery, in a plane view, of the optical surface (lens surface) of the lenses 11a and 12a of the respective lens wafers 11 and 12; and the outer periphery of the opening section 13a of the light shield plate 13.

As shown in FIG. 1(b), lens wafer 11, light shield plate 13, and the lens wafer 12 are laminated with adhesive in this order from the top. A lens wafer module 10 can be produced as an optical element wafer module configured by linking in the transverse direction a plurality of lens units, in which the opening section 13a of the light shield plate 13 is disposed between the optical surface (lens surfaces) of the lenses 11a and 12a on the top and bottom. The lens wafer module 10 is separated into individual pieces by a wire or a blade, along cut lines 14 in a lattice pattern indicated by dotted lines in the longitudinal and transverse directions. Thereby, lens modules as optical element modules mentioned below are produced.

Figure 2:
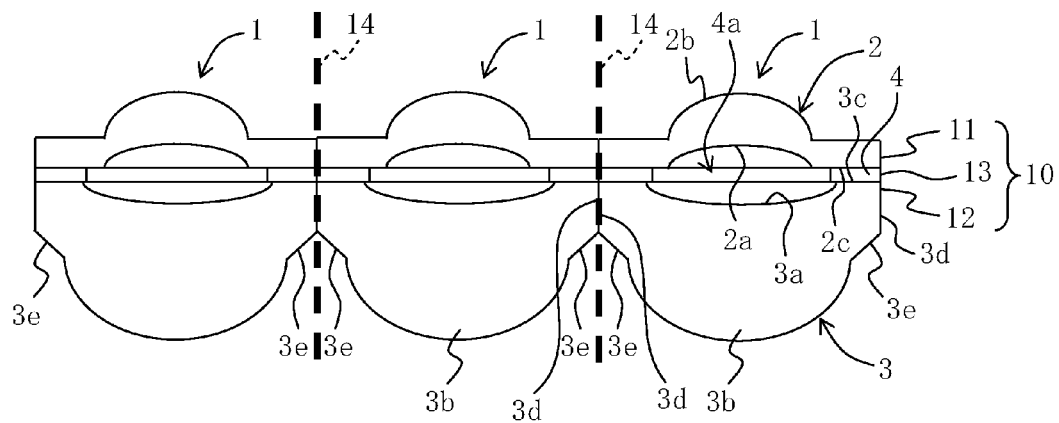
FIG. 2 is a partial longitudinal cross-sectional view schematically showing an example of a configuration of the lens wafer module in FIG. 1.

FIG. 2 is a partial longitudinal cross-sectional view schematically showing an example of a configuration of the lens wafer module 10 in FIG. 1.

As shown in FIG. 2, the lens wafer module 10 according to Embodiment 1 is configured by linking a plurality of lens modules 1 (lens units) in a matrix pattern in the longitudinal and transverse directions as an optical element module. In an individual lens module 1, a light shield plate 4 is provided between a top lens 2 and a bottom lens 3. The lenses 2 and 3 and the light shield plate 4 are laminated in a state where the positions of opposing lens surfaces 2a and 3a of the respective lenses 2 and 3 and the position of an opening section 4a of the light shield plate 4 are aligned at the top and bottom (optical axes of lenses 2 and 3, and the center position of the circular opening section 4a are aligned). Lenses 2 and 3 are provided with flange sections 2c and 3c, respectively, each having a planar surface and a quadrangular outline at the outer periphery of the opposing lens surfaces 2a and 3a in a plane view.

The lens 2 comprises a top lens surface 2b constituting a convex surface; and a bottom lens surface 2a constituting a concave surface. The lens 3 comprises a top lens surface 3a constituting a concave surface; and a bottom lens surface 3b constituting a convex surface. In summary, lens surfaces on the top and bottom are a combination of a convex surface and a concave surface, or may be a combination of convex surfaces or concave surfaces. The flange section 2c connected to the lens surface 2a and the flange section 3c connected to the lens surface 3a are glued to each other with adhesive, with the light shield plate 13 interposed therebetween.

Figure 4:
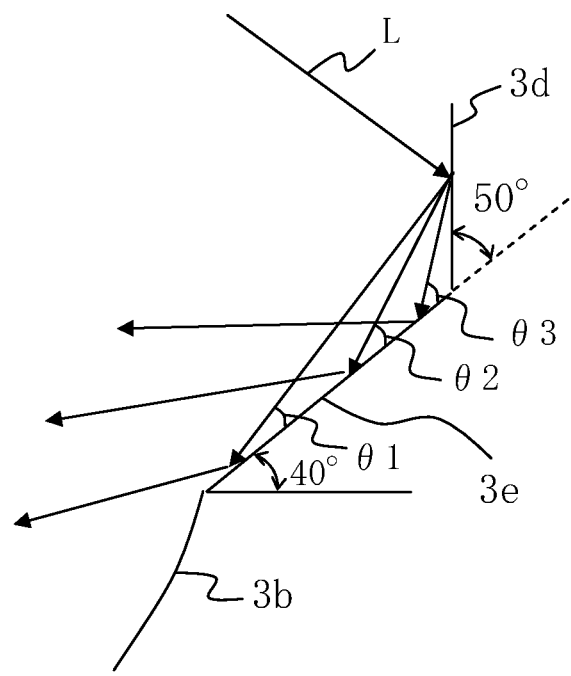
FIG. 4 is an expanded view of section B in FIG. 3(a).

Individual lens modules 1 can be obtained by cutting along the cut line 14 in a lattice pattern of the lens wafer module 10 according to Embodiment 1. However, instead of a planar flange section 3c between a cut surface 3d of the lens 3 and the top lens surface 3a of the lens 3, an inclined surface 3e inclined in an acute angle with respect to the planar surface is provided between the cut surface, especially the cut surface 3d of the lens 3 and the bottom lens surface 3b of the lens 3. FIGS. 3 and 4 are used to further describe in detail regarding the inclined surface 3e between the cut surface 3d of the bottom lens 3 and the bottom lens surface 3b.

FIG. 3(a) is a longitudinal cross-sectional view schematically showing the lens module 1 comprising a lens unit, which consists of a plurality of lenses (two lenses in this Embodiment) and is separated into individual pieces by cutting the lens wafer module 10 formed and laminated from a plurality of lenses at the wafer level. FIG. 3(b) is a back view of the lens module 1 in FIG. 3(a). FIG. 4 is an expanded view of section B in FIG. 3(a).

In FIGS. 3(a) and (b), stray light L enters the lens 2 of the lens module 1 in a diagonal direction, passes through the opening section 4a of the light shield plate 4, and undergoes diffuse reflection off the cut surface 3d. Further, the stray light L again reflects off the inclined surface 3e, which is the outer periphery of the lens surface 3b (optical surface) of the bottom lens 3 and is provided between the cut surface 3d and the lens surface 3b. The stray light L undergoing diffuse reflection off of the cut surface 3d does not enter the imaging surface of an imaging element 5 positioned below the lens module 1 as it would in a conventional configuration depending on the angle of the inclined surface 3e.

As shown in FIG. 3(b), in the bottom surface of the lens module 1, an inclined surface 3e is provided in a toric shape (or a shape where the outer peripheral section of the toric shape is cut off using the four sides of a quadrangle as chords in plane view) at the outer periphery of the lens surface 3b. Planar sections 3f of a substantially triangular shape are formed at the four corners of the outer periphery of the toric inclined surface 3e. Since the planar sections 3f are far from the center of the lens side surface (since it is difficult for light to hit the lens side surface), if the center sections of the sides of the quadrangle in a plane view are such that the cut surface 3d is immediately next to the inclined surface 3e, the planar sections 3f can be at the four corners of the quadrangular outline. Also, even if the planar sections 3f are only at the four corners of the quadrangular outline, the imaging region of the solid-state imaging element 5 is not positioned below the planar sections 3f. Thus, there is no effect on ghost and flare as mentioned above. As shown by the chain double-dashed line in FIG. 3(b), the outer periphery of the quadrangle in a plane view may certainly be configured entirely with the inclined surface 3e and may not have any planar section 3f. In this case, the chip itself would be smaller, but would require to be cut twice to separate into individual pieces. Herein, the ratio of the length of the side where the inclined surface 3e is immediately adjacent to the cut surface 3d to the whole side only needs to be greater than or equal to one tenth and less than or equal to one half.

As shown in the expanded view in FIG. 4, since the cut surface of the lens 3d is coarse due to separation into smaller pieces, stray light L hitting the cut surface 3d from the inside undergoes diffuse reflection and proceeds towards various directions. Since angles θ1 to θ3 formed between the proceeding stray light L and the inclined surface 3e are smaller than a predetermined angle, the stray light L does not penetrate the inclined surface 3e and undergoes total reflection. The stray light L undergoing total reflection off the inclined surface 3e does not proceed in a diagonally downward direction to reach the imaging surface of the imaging element 5 positioned below the inclined surface 3e. The angle formed between the extended line of the inclined surface 3e and the cut surface of lens 3d is less than or equal to an acute angle of 50 degrees herein (50 degree angle herein), and the incline of the inclined surface 3e with respect to the planar surface is greater than or equal to 40 degrees (40 degree angle herein). In summary, the incline of the inclined surface 3e with respect to the planar surface (a surface in the direction perpendicular to the optical axes of lenses 2 and 3) is 45 degrees±5 degrees (or an angle greater than or equal to 40 degrees and less than 50 degrees). If the angle of the inclined surface 3e with respect to the planar surface is greater than or equal to 40 degrees, light undergoes total reflection off the inclined surface 3e. However, it is more difficult to produce a metal mold as the angle is increased beyond 40 degrees. In summary, the inclined surface 3e only needs to have an acute incline with respect to a direction perpendicular to the optical axes of atop optical surface and a bottom optical surface, where diffuse reflection from the cut surface 3d undergoes total reflection at the incline. The inclined surface 3e may not be a linearly inclined surface in a cross-sectional view, but may be a substantially arc-shaped inclined surface. In this case, if the incline of the tangent line of the arc with respect to the planar surface is greater than or equal to 40 degrees, light undergoes total reflection off an arc-shaped inclined surface. The angle of total reflection varies depending on the refractive index of a lens, but light undergoes total reflection off a common lens material if the angle is greater than or equal to 40 degrees. Also, the inclined surface 3e is illustrated as a straight line in a cross-sectional view, but may be arc-shaped in a cross-sectional view, as long as diffuse reflection from the cut surface 3d undergoes total reflection off the inclined surface 3e. Thus, an inclined surface 3e is defined to include both a linear inclined surface in a cross-sectional view and an arc-like inclined surface in a cross-sectional view.

According to Embodiment 1 described above, the inclined surface 3e, which is for total reflection of diffuse reflection from the cut surface 3d, is formed between the cut surface 3d constituting a side surface and the bottom lens surface 3b. As such, by providing the inclined surface 3e as the surface in contact with the bottom part of the cut surface 3d where stray light L undergoes diffuse reflection, the stray light L undergoing diffuse reflection off the cut surface 3d undergoes total reflection off the inclined surface 3e, thereby preventing the stray light L from reaching the imaging surface of the imaging element 5. As such, cause of conventional ghost and flare can be prevented by total reflection of the stray light L undergoing diffuse reflection off the cut surface 3d at the inclined surface 3e, such that the stray light L undergoing diffuse reflection off of the cut surface 3d on the side surface of the lens does not reach the imaging surface of the solid-state imaging element 5. Thereby, fine, high quality captured images without ghost or flare are obtained.

In Embodiment 1, in the bottom lens 3 of the group comprising the top lens 2 and the bottom lens 3, by providing the inclined surface 3e as the surface in contact with the bottom part of the cut surface 3d where stray light L undergoes diffuse reflection, the stray light L is reflected off the inclined surface 3e after reflecting off the cut surface 3d to keep the stray light L from reaching the imaging surface of the imaging element 5. In this case, although no particular description was given, the top lens 2 may have any shape. An optical element is provided with an optical surface at the center section and a spacer section having a predetermined thickness at the outer periphery of the optical surface, and in the top lens 2 of Embodiment 1, the surface height of the spacer section is configured to be lower than the surface height of the optical surface. However, the configuration is not limited to this, and may be configured such that the surface height of the spacer section is higher than the surface height of the optical surface. Thereby, the holding tape is kept from sticking to the surface of an optical element region at the time of cutting; and contamination of the lens optical surface due to water-based cutting fluid is avoided by preventing the holding tape to peel off. Consequently, decrease in the optical characteristic is inhibited, and an optical element surface, such as a convex lens surface, functioning as an optical surface (optical surface), is kept clean.

In Embodiment 1, a case is described where: the light shield plate 4 is provided between the top lens 2 and the bottom lens 3; and the lenses 2, 3 and the light shield plate 4 are laminated in a state where the optical axes of the opposing lens surfaces of lenses 2 and 3 and the center of the opening section of the light shield plate 4 align on the top and bottom, but this configuration is not limiting. Two or more lenses may be stacked on the top and bottom, and the light shield plate 4 may also be provided between each lens. In any case, an optical element module, in which a plurality of optical elements are stacked, only needs to include a lens having the inclined surface 3e of the present invention as an optical element at the bottom.

Embodiment 2

In Embodiment 1, a case of a wafer level process, or specifically, a case where a plurality of lens modules 1 are obtained by cutting the lens wafer module 10 modularized with a plurality of lens wafers has been described. However, in Embodiment 2, a case of an injection molding process, or specifically, a case where a single lens is produced by an injection molding process will be described.

Figure 5:
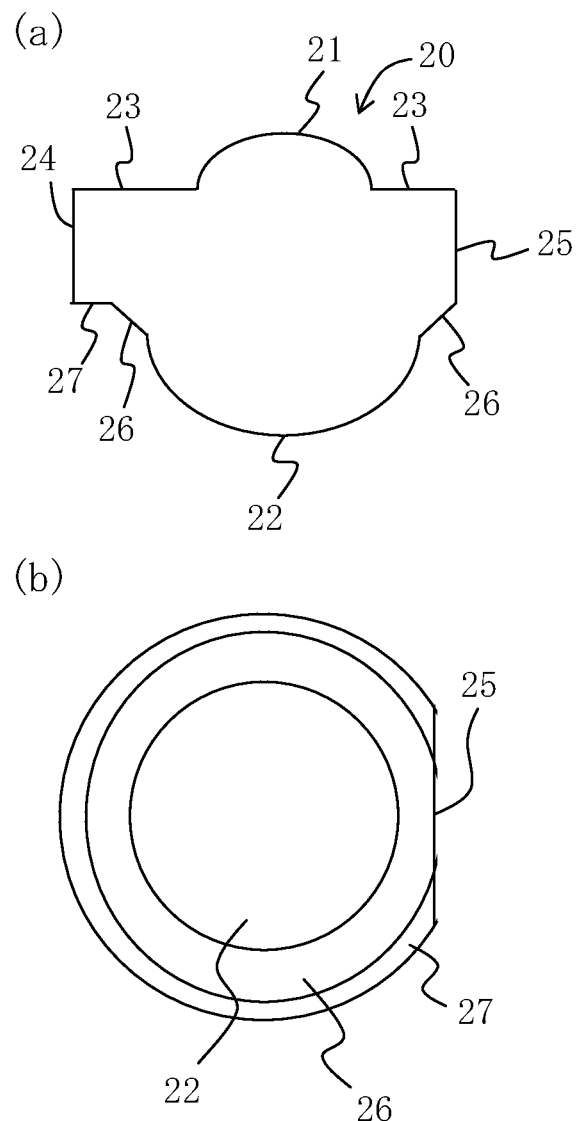
FIG. 5(a) is a longitudinal cross-sectional view schematically showing a lens module according to Embodiment 2 of the present invention, produced by an injection molding process.
FIG. 5(b) is a back view of the lens module in FIG. 5(a).

FIG. 5(a) is a longitudinal cross-sectional view schematically showing a lens produced by an injection molding process as an optical element in Embodiment 2 of the present invention. FIG. 5(b) is a rear view of the lens in FIG. 5(a). FIG. 6(a) is a longitudinal cross-sectional view for describing the production method of the lens in FIG. 5(a). FIG. 6(b) is a back view of the lens of FIG. 6(a).

As shown in FIG. 5(a) and FIG. 5(b), a lens 20 as an optical element of Embodiment 2 is formed by resin injection molding with materials such as transparent resin material, the lens 20 constituted of: a top lens surface 21 constituting an upwardly convex surface; a bottom lens surface 22 constituting a downwardly convex surface; a planar flange section 23, having a partially circular shape in plane view with a portion cut off at a chord, provided on the outer periphery of the lens surface 21 in a plane view; a circumferential side surface 24 adjacent to the planar flange section 23 with a partially circular shape in plane view; a side planar surface 25 adjacent to the planar flange section 23, made by cutting off a portion of the circumferential side surface 24 at a chord; an inclined surface 26 inclined at an acute angle with respect to the planar surface, where the toric shaped inclined surface is provided on the outer periphery of the circular lens surface 22 between the side planar surface 25 and the bottom lens surface 22; and a partially toric planar surface 27 in a plane view provided further outside the periphery of the toric inclined surface 26 in a plane view. As shown in FIG. 6(a) and FIG. 6(b), on the side planar surface 25, a runner sprue 28 is left from the molding injection of resin materials into a metal mold during resin injection molding production. The runner sprue 28 is cut off from the side planar surface 25 at a cut location 29 after metal mold release to produce the lens 20.

The inclined surface 26 is provided, inclined at an acute angle with respect to the planar surface, between the side planar surface 25 including the cut surface of the lens 20 of Embodiment 2 and the bottom lens surface 22; and between a partially toric planar surface 27 in a plane view and the bottom lens surface 22. Specifically, in a shape in a plane view where a portion of the outer periphery with a circular bottom outline in a plane view is cut off using at least one side as a chord, the inclined surface 26 is formed in a toric shape in a plane view on the outer periphery of the bottom side optical surface (lens surface 22). The side planar surface 25 and partially toric planar surface 27 in a plane view are formed on the outer periphery in a plane view of the inclined surface 26.

According to Embodiment 2 described above, by providing the toric inclined surface 26 in a plane view as the surface in contact with the bottom part of the side planar surface 25 including the cut surface, where stray light L undergoes diffuse reflection and from which the runner sprue 28 is cut off, the stray light L undergoing diffuse reflection off the cut surface of the side planar surface 25 is undergoes total reflection off the inclined surface 26, thereby preventing the stray light L from reaching the imaging surface of the imaging element 5, which is not illustrated herein. As such, the cause of conventional ghost and flare can be prevented by total reflection of the stray light L undergoing diffuse reflection off the cut surface of the side planar surface 25 at the inclined surface 26, such that the stray light L undergoing diffuse reflection off the cut surface of the side planar surface 25 of the lens 20 does not reach the imaging surface of the imaging element 5. Thereby, fine, high quality captured images without ghost or flare are obtained.

Embodiment 3

In Embodiment 1, the lens module 1 is obtained by cutting the lens wafer module 10 produced by a wafer level process. In Embodiment 2, a lens 20 produced by an injection molding process is obtained. In Embodiment 3, an imaging module will be described, which uses the lens module 1 or the lens 20 according to Embodiment 1 and 2, respectively.

Figure 7:
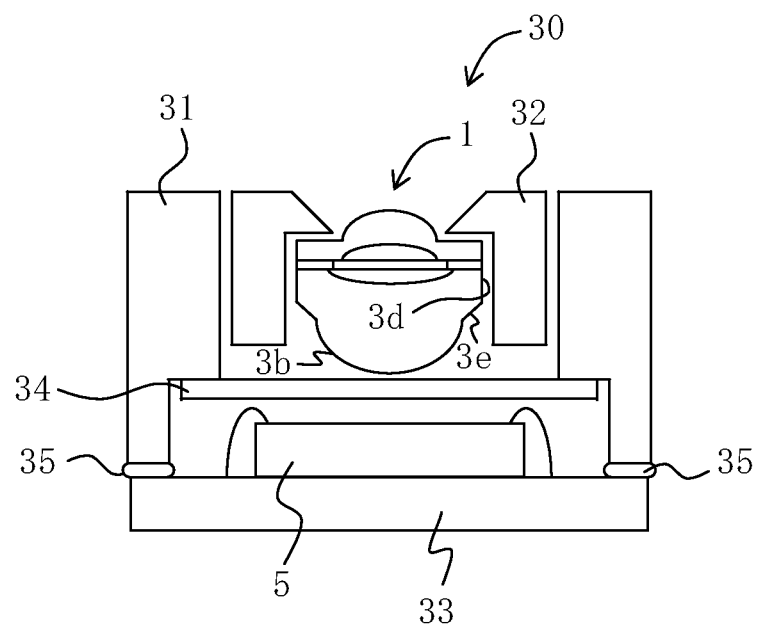
FIG. 7 is a longitudinal cross-sectional view schematically showing an imaging module according to Embodiment 3 of the present invention.

FIG. 7 is a longitudinal cross-sectional view schematically showing an imaging module according to Embodiment 3 of the present invention.

In FIG. 7, an imaging module 30 as an electronic element module of Embodiment 3 comprises: holder member 31 that is a dust proofing case; a lens holder 32 mounted at the upper part of the holder member 31; the light gathering lens module 1 (or lens 20) contained in the lens holder 32; a substrate 33; a solid-state imaging element 5 (sensor chip) as an electronic element, which is provided on the substrate 33 and is wire-bonded to the substrate 33; an IR cut-off filter 34 fixed on the step section inside the holder member 31 and disposed between the lens module 1 (or the lens 20) and the solid-state imaging element 5 in a transverse direction; and adhesion section 35 securing the bottom surface of the outer wall of the holder member 31 and the substrate 33.

The holder member 31, together with the substrate 33, is configured to seal or semi-seal the inside by covering, in order from the top, the lens holder 32, the lens module 1 (or the lens 20), IR cut-off filter 34, and the solid-state imaging element 5, which are built-in. The holder member 31 is constituted of a resin housing, which gives a thin outer wall and enables light shielding and sealing or semi sealing. A circular hole opposing the lens module 1 (or the lens 20) for incident light to pass through is formed on the top surface of the housing, or specifically, on the top surface of the cylindrical shape. The optical axis of the lens module 1 (or the lens 20) passes through the center of the circular hole. The holder member 31 is positioned so as to focus incident light on the imaging region of the solid-state imaging element 5 with the lens module 1 (or the lens 20) to form an image.

The lens module 1 (or the lens 20) is a compound lens for focusing light from a subject to the imaging region of the solid-state imaging element 5 to form an image, and is made of transparent acrylic plastic materials and/or glass materials.

The solid-state imaging element 5 comprises a solid-state imaging element in which a plurality of photoelectric conversion sections (a plurality of light reception sections) are formed in a matrix pattern for photoelectrically converting and capturing an image of incident light from a subject penetrating the lens module 1 (or the lens 20) to the center of the imaging region of the solid-state imaging element 5. The solid-state imaging element 5 can be applied to both a CMOS image sensor and a CCD image sensor. In a CMOS image sensor, for each pixel section unit, a signal readout circuit is provided. Signal readout circuits from each pixel section unit are connected to one another by a multi-layer wiring layer and are involved with selection at a photoelectric conversion section and with signal output from the photoelectric conversion section. In a CCD image sensor, a plurality of photoelectric conversion sections are provided in a two-dimensional pattern in a light reception surface of an imaging region. Signal charges photoelectrically converted at the photoelectric conversion section are read out to the charge transfer section CCD, and sequentially transferred in a predetermined direction. Then, signal charges are collectively detected, as opposed to for each light reception section, at a charge detection section sequentially. Next, signal charges are amplified as imaging signals and outputted.

The infrared (IR) cut-off filter 34 bridges across and is fixed between the step sections of the holder member 31 so as to cross above the solid-state imaging element 5. The infrared (IR) cut-off filter is for cutting off infrared light from incident light passing through the lens module 1 (or the lens 20).

According to the imaging module 30 in Embodiment 3 embedded with the lens module 1 or the lens 20 according to Embodiments 1 or 2 described above, in the lens 20 as an optical element or the lens module 1 as an optical element module produced by cutting, the shape of the optical element closest to the solid-state imaging element 5 has an inclined surface shape of the inclined surface 3e or 26 at the part of the surface in contact with a cut surface 3d or 25.

As such, by providing an inclined surface as the surface in contact with the bottom part of the cut surface of the lens module 1 or the lens 20 where stray light L undergoes diffuse reflection, the stray light L undergoing diffuse reflection off the cut surface undergoes total reflection off the inclined surface, thereby preventing the stray light L from reaching the imaging surface of the solid-state imaging element 5. As such, cause of conventional ghost and flare can be prevented by total reflection of the stray light L undergoing diffuse reflection off the cut surface at the inclined surface, such that the stray light L undergoing diffuse reflection off the cut surface of the side surface of the lens does not reach the imaging surface of the solid-state imaging element 5. Thereby, fine, high quality captured images without ghost or flare are obtained.

Embodiment 4

Figure 8:
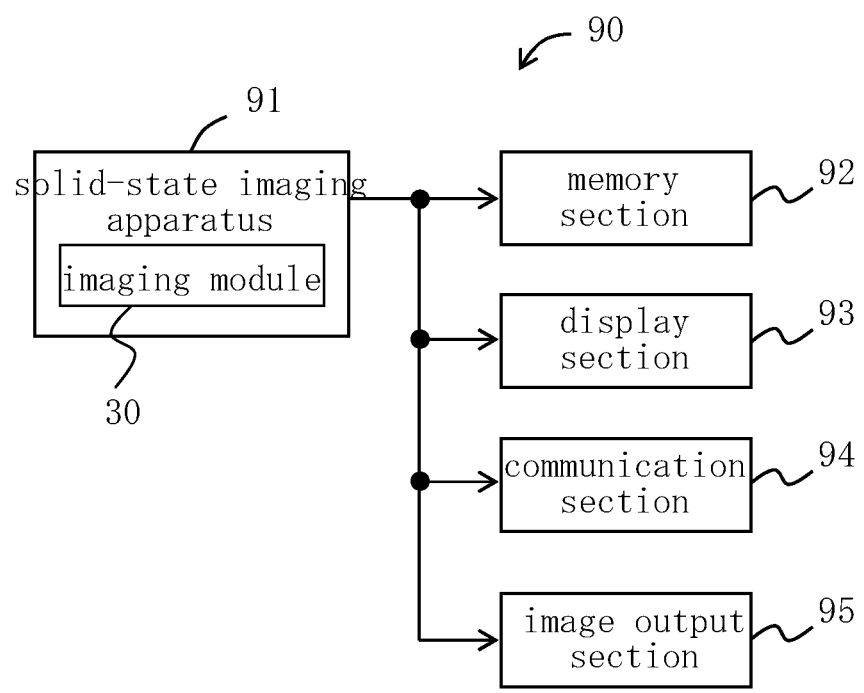
FIG. 8 is a block diagram showing, as Embodiment 4 of the present invention, an example of a schematic configuration of an electronic information device using an imaging module, which uses the lens module or the lens according to Embodiment 1 or 2 of the present invention in an imaging section.
Figure 9:
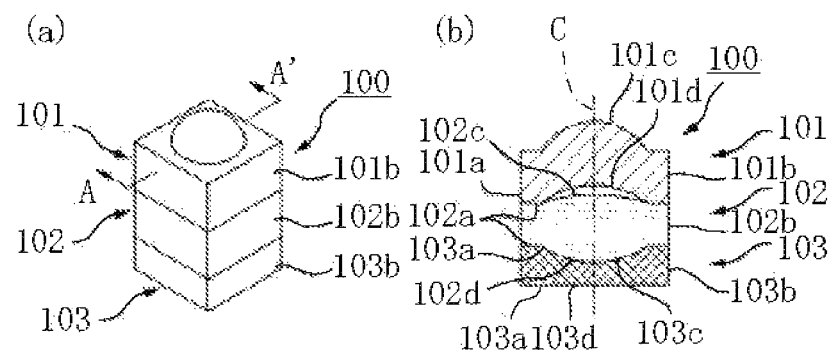
FIG. 9(a) is a perspective view of a conventional imaging lens unit disclosed in Patent Literature 1.
FIG. 9(b) is a longitudinal cross-sectional view of the imaging lens unit in FIG. 9(a) along the line A-A'.
Figure 10:
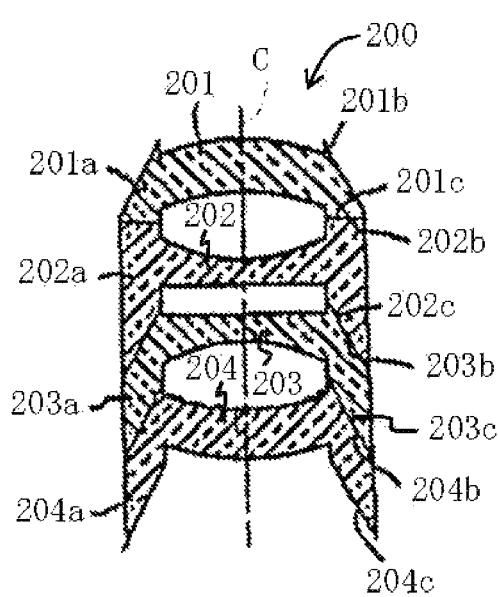
FIG. 10 is a longitudinal cross-sectional view of a conventional imaging lens unit disclosed in Patent Literature 2.
Figure 12:
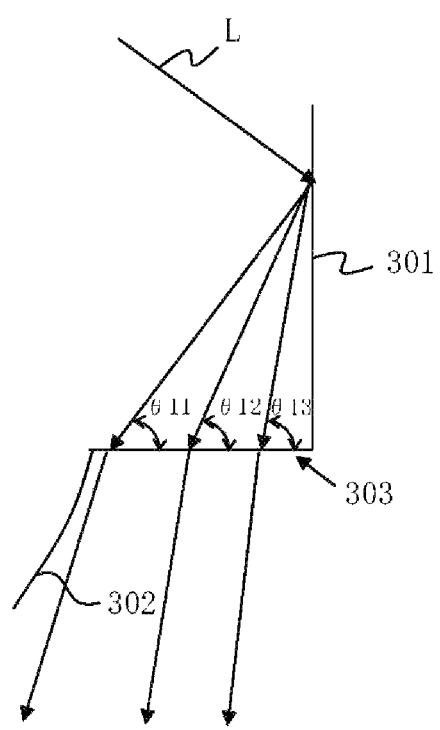
FIG. 12 is an expanded view of section B' of FIG. 11.

FIG. 8 is a block diagram showing, as Embodiment 4 of the present invention, an example of a schematic configuration of an electronic information device using an imaging module, which uses the lens module 1 or the lens 20 according to Embodiment 1 or 2 of the present invention in an imaging section.

In FIG. 8, an electronic information device 90 according to Embodiment 4 comprises: a solid-state imaging apparatus 91 that obtains color image signals by performing predetermined signal processing (digital image processing such as noise reduction processing, black level correction, color interpolation, white balance, and gamma correction) on imaging signals obtained from the imaging module 30 using the lens module 1 (or the lens 20); a memory section 92 (e.g., recording media) for data-recording color image signals from the solid-state imaging apparatus 91 after predetermined signal processing is performed on the color image signal for recording; a display section 93 (e.g., a liquid crystal display apparatus) for displaying the color image signals from the solid-state imaging apparatus 91 on a display screen (e.g., liquid crystal display screen) after predetermined signal processing is performed on the color image signals for display; a communication section 94 (e.g., a transmitting and receiving device) for communicating the color image signals from the solid-state imaging apparatus 91 after predetermined signal processing is performed on the color image signals for communication; and an image output section 95 (e.g., a printer) for printing the color image signals from the solid-state imaging apparatus 91 after predetermined signal processing is performed for printing. The electronic information device 90 is not limited to this configuration, and besides the solid-state imaging apparatus 91, may include at least one of the memory section 92, display section 93, communication section 94, and an image output section 95 such as a printer.

As the electronic information device 90, an electronic information device that includes an image input device is conceivable, such as a digital camera (e.g., digital video camera or digital still camera), an image input camera (e.g., a monitoring camera, a door phone camera, a camera equipped in a vehicle including a vehicle back view monitoring camera, or a video telephone camera), a scanner, a facsimile machine, a camera-equipped cell phone device and a portable digital assistant (PDA).

Therefore, according to Embodiment 4 of the present invention, the color image signals from the solid-state imaging apparatus 91 can be: displayed on a display screen properly; printed out on a sheet of paper using an image output section 95; communicated properly as communication data via a wire or a radio signal; stored properly at the memory section 92 by performing predetermined data compression processing; and various data processes can be properly performed.

As described above, the present invention is exemplified by the use of its preferred Embodiments 1 to 4 of the present invention. However, the present invention should not be interpreted solely based on Embodiments 1 to 4 described above. It is understood that the scope of the present invention should be interpreted solely based on the scope of the claims. It is also understood that those skilled in the art can implement equivalent scope of technology, based on the description of the present invention and common knowledge from the description of the detailed preferred Embodiments 1 to 4 of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of: an optical element wafer module stacked with a plurality of optical element wafers having a plurality of lenses arranged in a two-dimensional pattern; an optical element module cut from the optical element wafer module; an electronic element module where the optical element module is modularized with an electronic element; and an electronic information device, such as a digital camera (e.g., a digital video camera or a digital still camera), an image input camera, a scanner, a facsimile machine, a personal digital assistant (PDA), a camera-equipped cell phone device, and a video telephone device using the electronic element module in an imaging section. According to the present invention as described above, since an inclined surface is formed, which is for total reflection of diffuse reflection from the side surface of a lens, at least between the side surface of the lens and the bottom lens surface, the cause of ghost and flare can be prevented by keeping stray light reflected off the side surface of the lens from reaching an imaging region of an imaging element.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical element, comprising:
   a side surface where light undergoes diffuse reflection inside the optical element between the outline of a top optical surface and a bottom optical surface; and
   an inclined surface for total reflection of diffuse reflection from the side surface, formed at least between the side surface and the bottom optical surface
   wherein an edge of the inclined surface is ring shaped in a plane view which is perpendicular to the side surface.

2. An optical element according to claim 1, wherein the inclined surface is inclined at an acute angle in the direction perpendicular to optical axes of the top optical surface and the bottom optical surface.

3. An optical element according to claim 2, wherein the angle of the incline inclined at an acute angle is between 40 degrees and 50 degrees inclusive.

4. An optical element according to claim 1, having a toric shape in a plane view or a shape in a plane view where a toric outer peripheral section is cut off using the four sides of a quadrangle in a plane view as chords,
   wherein the inclined surface is provided on the outer periphery of the bottom optical element in a plane view.

5. An optical element according to claim 4, wherein the ratio of the length of the side where the inclined surface is directly adjacent to the side surface to the whole side of the quadrangle in a plane view is greater than or equal to one tenth and less than or equal to one half.

6. An optical element according to claim 1, wherein a portion of or the entire side surface is a cut surface.

7. An optical element according to claim 6, wherein a lens wafer with a plurality of lenses arranged in a two-dimensional matrix pattern is cut by a wafer level process such that the side surface is a cut surface.

8. An optical element according to claim 6, wherein a runner sprue on a side surface of a lens is cut by an injection molding process such that the side surface is partially a cut surface.

9. An optical element according to claim 6, wherein the inclined surface is formed in a toric shape on the outer periphery of the bottom optical surface in a plane view, and the side surface and a partially toric planar surface in a plane view are formed on the outer periphery of the inclined surface in a plane view, in a shape in a plane view with the outer periphery with a circular bottom surface outline in a plane view cut off using at least one side as a chord.

10. An optical element according to claim 1, wherein the optical element is a light gathering lens.

11. An optical element module stacked with a plurality of optical elements, comprising an optical element according to claim 1 at the bottom.

12. An optical element module according to claim 11, wherein a light shield plate is provided between a top optical element and a bottom optical element, and the optical elements and the light shield plate are laminated in a state where the optical axes of opposing optical surfaces of each optical element and the center of the opening section are aligned at top and bottom.

13. An optical element module according to claim 12, wherein each of the optical elements is provided with a flange section with a quadrangular outline in a plane view having a planar surface on the outer periphery in a plane view of opposing optical surfaces.

14. An electronic element module, comprising:
an optical element according to claim 1; and
a solid-state imaging element in which a plurality of light reception sections are formed in a matrix pattern for photoelectrically converting and capturing an image of incident light from a subject penetrating through the optical element or the optical element module.

15. An electronic element module, comprising:
an optical element module according to claim 11; and
a solid-state imaging element in which a plurality of light reception sections are formed in a matrix pattern for photoelectrically converting and capturing an image of incident light from a subject penetrating through the optical element or the optical element module.

16. An electronic element module according to claim 14, wherein the shape of part of an optical element closest to the solid-state imaging element in contact with a cut surface has an inclined surface in the optical element or the optical element module produced by cutting.

17. An electronic element module according to claim 15, wherein the shape of part of an optical element closest to the solid-state imaging element in contact with a cut surface has an inclined surface in the optical element or the optical element module produced by cutting.

18. An electronic information device comprising:
the electronic element module according to claim 14 used in an imaging section as an image input device.

19. An electronic information device comprising:
the electronic element module according to claim 15 used in an imaging section as an image input device.

* * * * *